(12) United States Patent
Ghizzoni et al.

(10) Patent No.: US 6,425,181 B2
(45) Date of Patent: Jul. 30, 2002

(54) METHOD AND A MACHINE FOR THE PRODUCTION OF ACCUMULATOR PLATES

(75) Inventors: Giulio Ghizzoni, Buccinasco; Luigi Cucchi, Romano di Lombardia, both of (IT)

(73) Assignee: Societa Industriale Accumulatori S.p.A.

( * ) Notice: Subject to any disclaimer, the term of this patent is extended or adjusted under 35 U.S.C. 154(b) by 0 days.

(21) Appl. No.: 09/862,498

(22) Filed: May 23, 2001

(30) Foreign Application Priority Data

May 23, 2000 (IT) .................. TO2000A000467

(51) Int. Cl.⁷ .............................................. B21D 51/16
(52) U.S. Cl. ............................ 29/890.06; 29/2; 29/6.1; 29/6.2; 29/896.6
(58) Field of Search ............... 29/890.06, 6.1, 29/6.2, 896.6, 557, 558, 335, 33 Q, 2; 72/185, 187

(56) References Cited

U.S. PATENT DOCUMENTS

| 4,220,030 A | | 9/1980 | McDowell |
| 4,305,187 A | * | 12/1981 | Iwamura et al. |
| 4,315,356 A | * | 2/1982 | Laurie et al. |
| 4,486,927 A | * | 12/1984 | Hunter et al. |
| 4,534,091 A | * | 8/1985 | Kline |
| 4,649,607 A | * | 3/1987 | Kuhn, II |
| 5,461,761 A | * | 10/1995 | Knopfli et al. |
| 6,202,271 B1 | * | 3/2001 | Goda et al. |
| 6,212,744 B1 | * | 4/2001 | Inanobe et al. |

FOREIGN PATENT DOCUMENTS

| DE | 37 41 162 A1 | | 7/1988 |
| FR | 2697765 | * | 5/1994 |
| GB | 2 200 069 B | | 7/1988 |
| JP | 3-210924 | * | 9/1991 |

* cited by examiner

*Primary Examiner*—S. Thomas Hughes
*Assistant Examiner*—T. Nguyen
(74) *Attorney, Agent, or Firm*—Sughrue Mion, PLLC

(57) ABSTRACT

The method comprises the steps of: moving a strip through an expansion machine having at least one expansion punching tool and an associated complementary tool or matrix, causing the expansion machine to operate in synchronism with the movement of the strip so as to form a grid strip having an non-expanded central portion and two longitudinal grid portions adjacent the central portion, and forming, in the non-expanded central band, a plurality of openings or windows separated by transverse bridges which are to form the connection appendages or lugs of the plates. These openings or windows are formed, in the expansion machine, by punches operated in phase with the operation of the expansion punching tool.

3 Claims, 6 Drawing Sheets

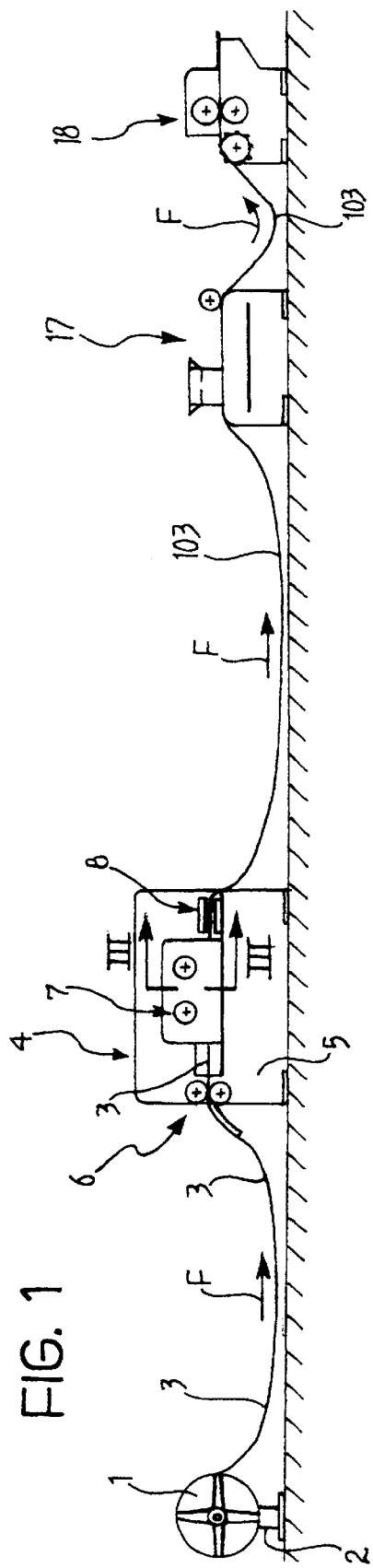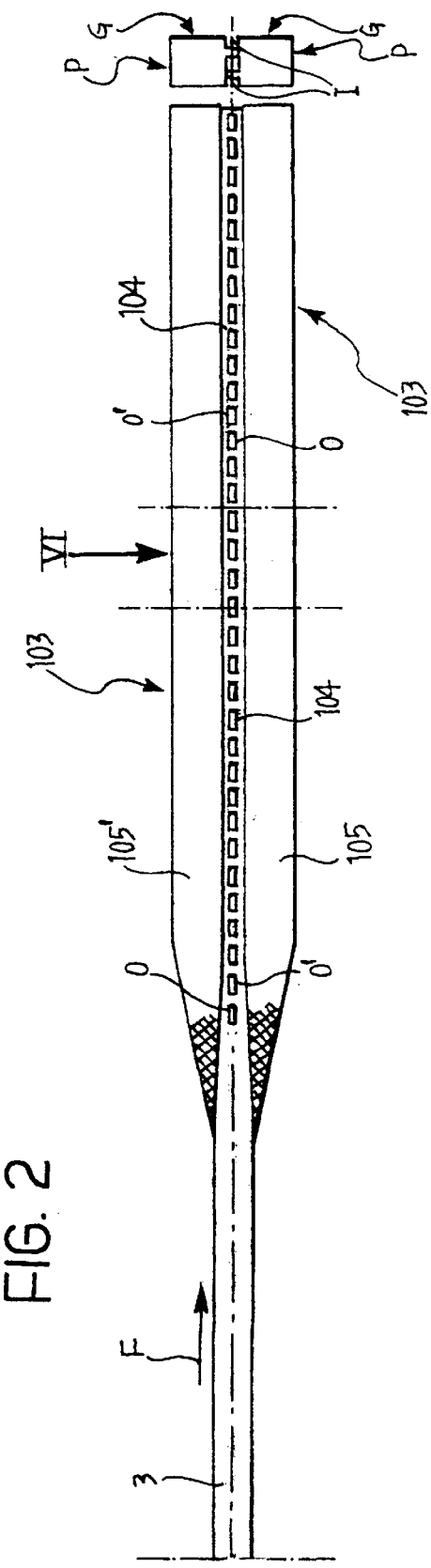

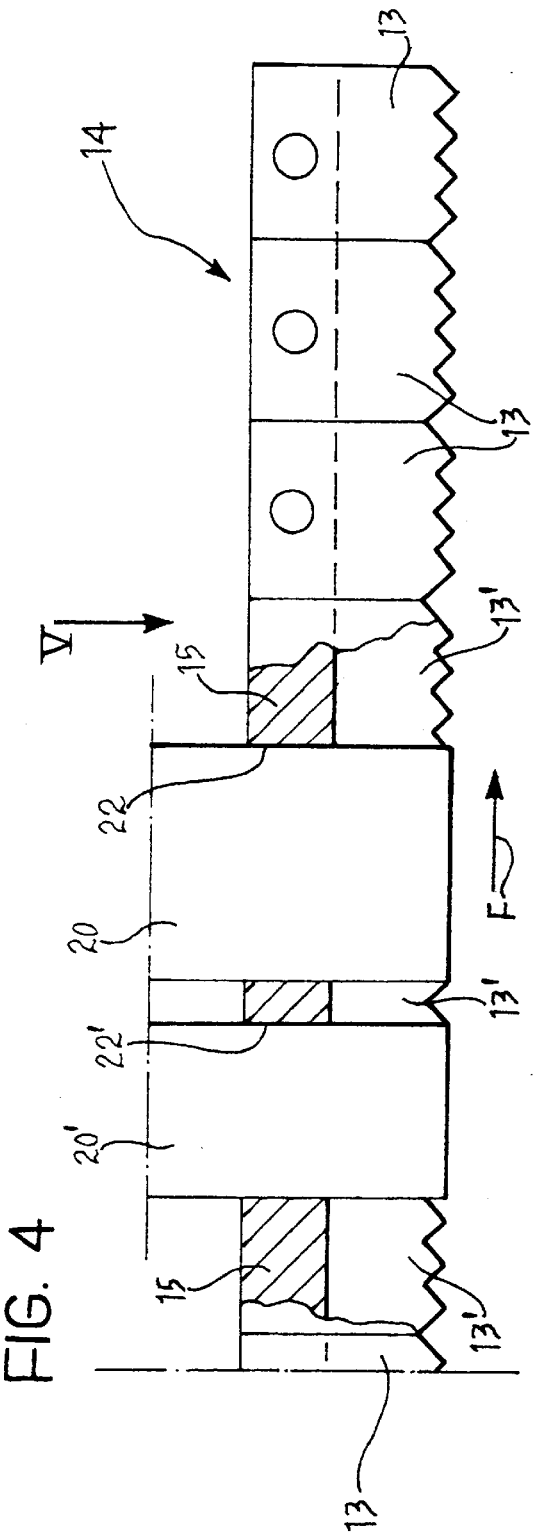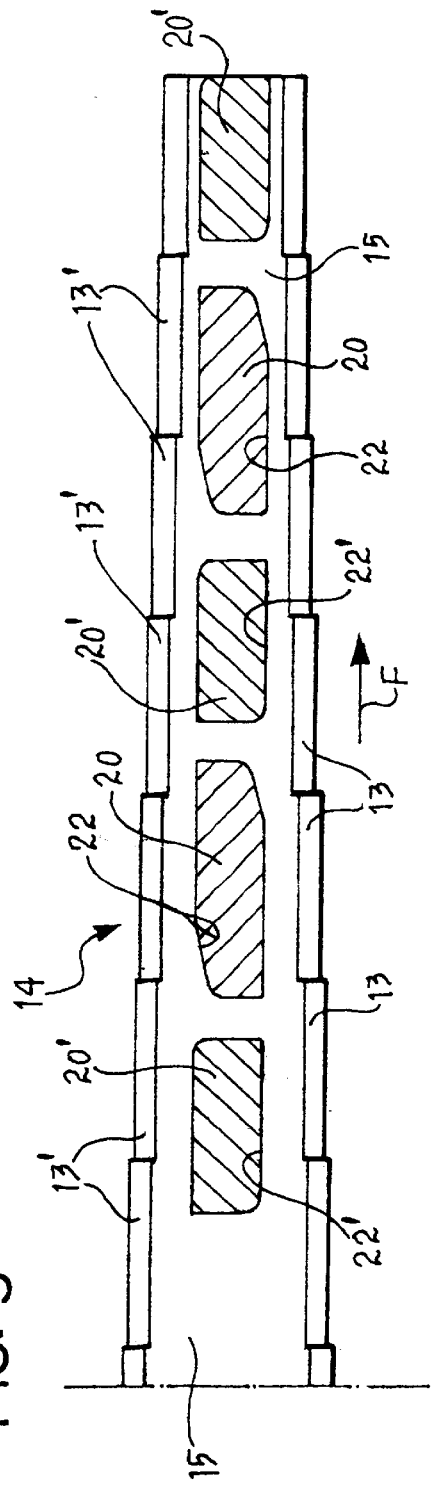

METHOD AND A MACHINE FOR THE PRODUCTION OF ACCUMULATOR PLATES

BACKGROUND OF THE INVENTION

The present invention relates to a method of producing accumulator plates having respective connection appendages or lugs, from a virgin strip made, for example, of a metal alloy such as a lead alloy.

More specifically, the subject of the invention is a method in which a virgin strip is fed through an expansion machine having at least one expansion punching tool and an associated complementary tool or matrix, the machine being caused to operate in synchronism with the movement of the strip so as to produce a strip formed as a grid having a non-expanded central portion or band and two lateral, longitudinal grid portions.

A method of this type is known, for example, from British patent GB-B-2 200 069.

According to the prior art, in order to produce the connection appendages or lugs of the individual plates, a plurality of openings or windows, separated by transverse bridges which are to form the connection appendages or lugs, is formed in the non-expanded, central portion of the grid strip, downstream of the expansion machine.

These openings or windows are typically formed by a punching press disposed downstream of the machine for the expansion of the strip.

In conventional plants of the type described above, the operation of the punching press for forming the above-mentioned openings or windows is completely unrelated to that of the expansion machine so that, in the plates thus produced, the connection appendages or lugs are positioned completely randomly relative to the nodes of the meshes of the grid portions of the plates. This leads to the disadvantage that it is not possible to ensure that the plates formed in succession from the grid strip are cut in the region of a transverse row of nodes of the meshes. Cropped limbs or ends are therefore inevitably formed at two opposite ends of each plate and these are dangerous since, in a battery of accumulators, they may cause a contact between plates with different polarities.

Expansion machines for producing grid strips in which the strip is supplied by means of a pulling device disposed downstream of the expansion punching tool and pulling the strip along with continuous motion have been proposed. In these machines, the expansion punching tool is subjected to two combined movements, that is: a vertical oscillatory movement for the cutting of the strip and a horizontal oscillatory movement parallel to the direction of movement of the strip so that the meshes are cut with zero relative velocity between the tool and the strip. In these machines, a rotary cutter is also installed downstream of the expansion tool and punches the windows in the central portion or band of the grid strip.

These machines also suffer from the disadvantage described above connected with the random positioning of the connection lugs relative to the nodes of the meshes of the grid portion in each plate.

In order to remedy the disadvantage outlined above, the use of expansion plants in which a plurality of uniformly spaced openings are provided in the virgin strip beforehand, for example, along its longitudinal centreline, has been considered. In this case, the strip can be fed through the expansion machine by means of an indexed pulling wheel having a plurality of peripheral projections which engage in the holes pre-formed in the strip, bringing about a stepped movement thereof. During the subsequent step of punching of the windows in the central band of the grid strip, a device similar to the indexed wheel is used for feeding the strip so that the windows are always formed in the desired positions relative to the meshes of the grid portion of the plates. This method is in fact quite complex and does not generally permit good productivity.

SUMMARY OF THE INVENTION

An object of the present-invention is therefore to propose a method and a machine which prevent the disadvantages of the solutions outlined above.

This and other objects are achieved, according to the invention, by a method the main characteristics of which are defined in appended claim 1, as well as by a machine the principal characteristics of which are defined in claim 4.

BRIEF DESCRIPTION OF THE DRAWINGS

Further characteristics and advantages of the invention will become clear form the following detailed description given purely by way of non-limiting example with reference to the appended drawings, in which:

FIG. 1 is a schematic side view of a plant comprising a machine according to the invention, FIG. 2 is a plan view showing a strip processed in the plant of FIG. 1, on a transversely enlarged scale, FIG. 4 is a side view taken on the arrow IV of FIG. 3 and shows, in a partially sectioned view, a punching tool included in a machine according to the invention, FIG. 5 is a plan view taken on the arrow V of FIG. 4.

DETAILED DESCRIPTION OF THE INVENTION

Figure 3:
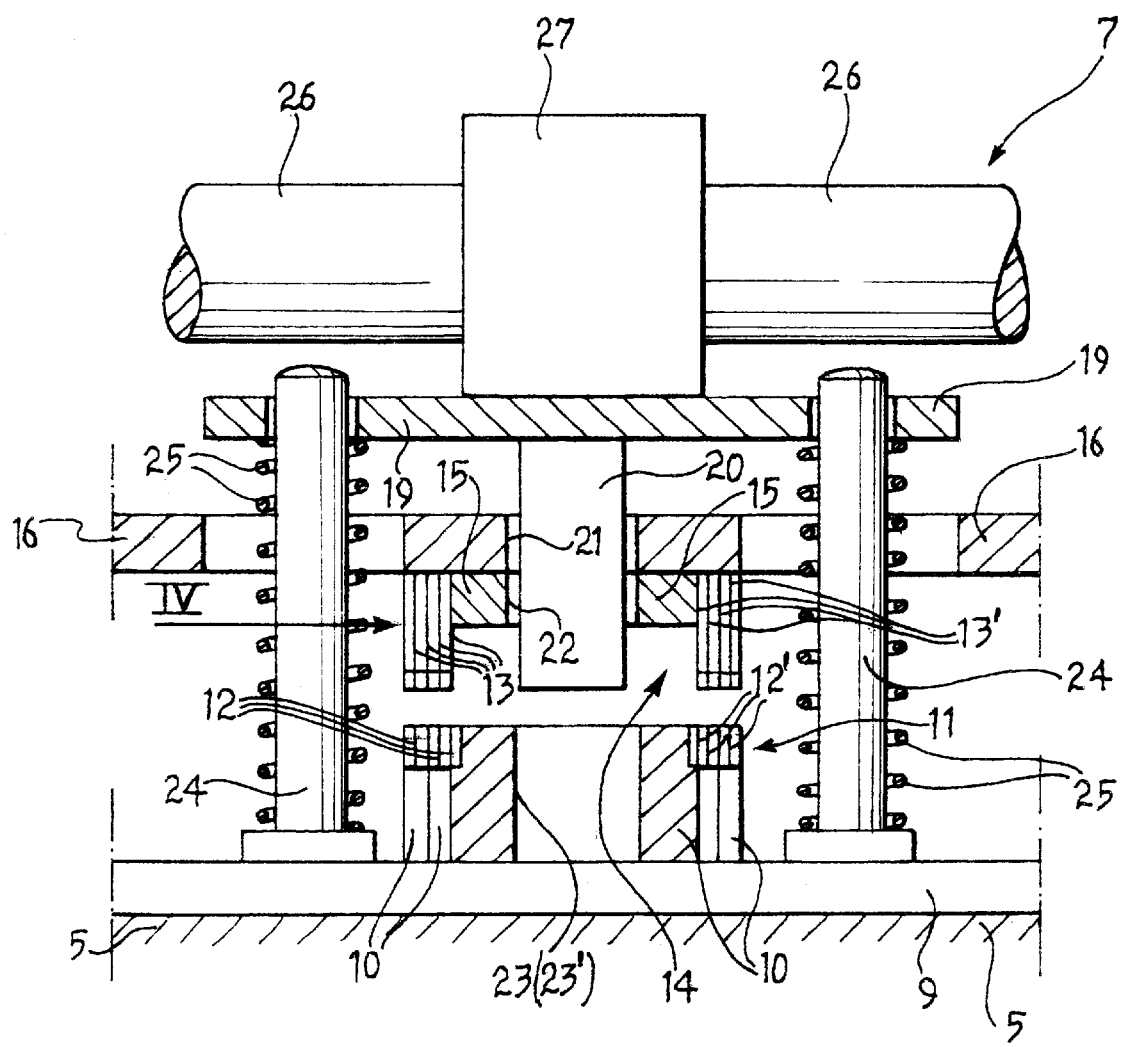
FIG. 3 is a partial cross-section, taken on the line III—III of FIG. 1.

FIG. 1 shows schematically and partially, a plant for the production of accumulator grid plates.

The plant comprises a reel 1 supported for rotation about a horizontal axis by a support 2. A continuous strip of rolled metal, for example lead alloy, is wound on the reel.

Downstream of the reel 1, the strip 3 reaches an expansion machine, generally indicated 4. This machine comprises a base 5 which supports, on the input side, a thrust device 6 for causing the strip 3 to advance in steps. The device 6 is, for example, a so-called intermittent feeder, driven by an electric motor or by a mechanical device.

Downstream of the feeder 6 the machine 4 has an expansion section, generally indicated 7 in FIG. 1, downstream of which in turn there is a pulling device 8 of known type which, in operation, can keep the strip 3 permanently subjected to a slight tension in the direction of advance of the strip, indicated by the arrows F.

As can be seen in FIG. 3, the expansion section 7 of the machine 4 comprises a base plate 9 which is fixed to the base 5 and to which a matrix or complementary expansion tool 11 of known type in turn is fixed. The matrix 11 comprises a generally elongate support 10 tapered in the direction of advance of the strip 3 and carrying, on top of its side portions, two sets of fixed blades 12 and 12' for cooperating with corresponding punches 13 and 13' of an expansion tool, generally indicated 14 (see also FIGS. 4 and 5).

In the embodiment shown, the punches 13, 13' of the expansion tool 14 are fixed to the two sides of an elongate support bar 15 tapered in steps in the direction of advance F of the strip (FIG. 5).

With reference to FIG. 3, the expansion tool 14 is fixed to the lower face of a substantially horizontal plate 16 which is movable vertically in known manner, for example, by means of one or more motor-driven horizontal shafts arranged transverse the direction of advance of the strip and having respective cams or eccentric elements cooperating with the plate. Vertical compression springs are associated with the plate 16 in a known manner, not shown in FIG. 3, and tend to keep the plate in the raised position shown in that drawing.

The expansion section as described up to now is of a known type, for example, of the type described in detail in the British patent cited above. The expansion tool 14 is intended to be lowered and raised cyclically in operation, in synchronism with the intermittent advance of the strip 3 so as to bring about a progressive expansion of the longitudinal and lateral portions of the strip 3 by successive incisions and plastic deformations thereof. A grid strip, indicated 103 in FIG. 2 is thus formed, in known manner, and has a non-expanded central portion or band 104 between two longitudinal grid portions 105 and 105'.

Figure 7:
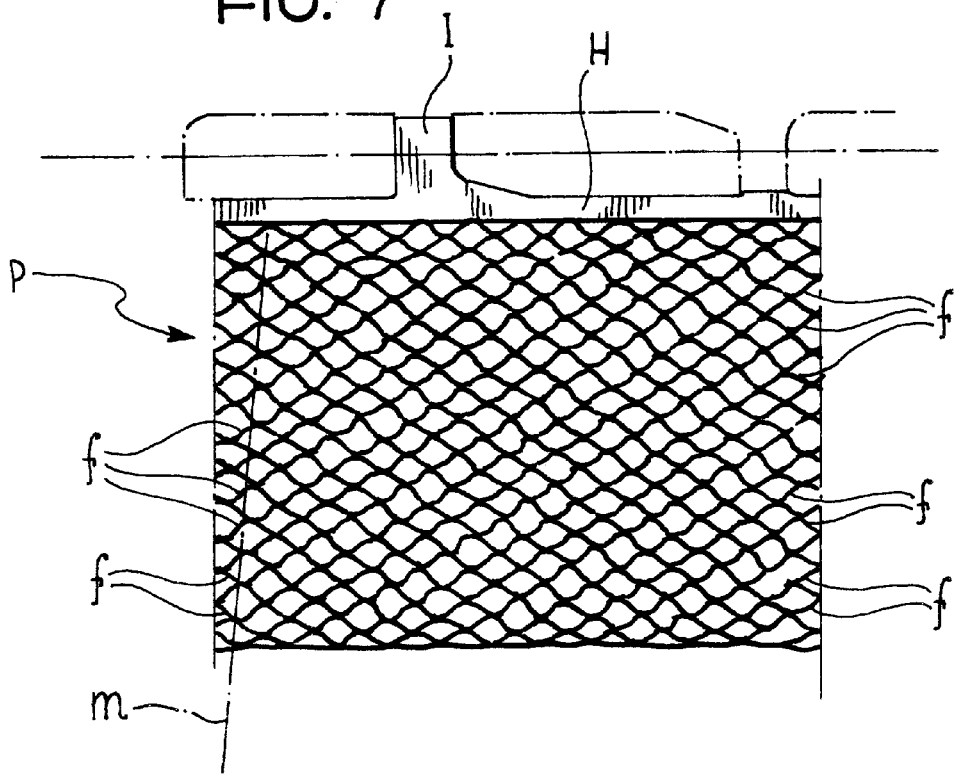
FIGS. 7 and 8 show two accumulator plates with meshes which are not aligned transversely and meshes which are aligned transversely, respectively.
Figure 8:
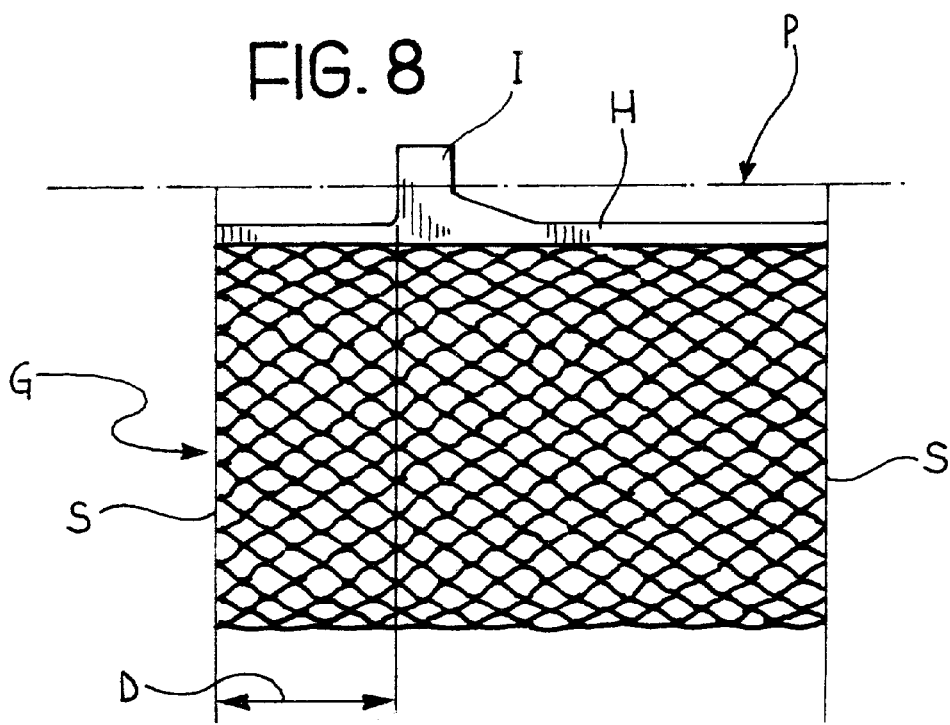

The grid strip 103 is intended to permit the production of accumulator plates P each having, as can be seen, for example, in FIGS. 7 and 8, a grid portion G with a head portion H which is not formed as a grid and which forms a connection appendage or lug I.

Figure 6:
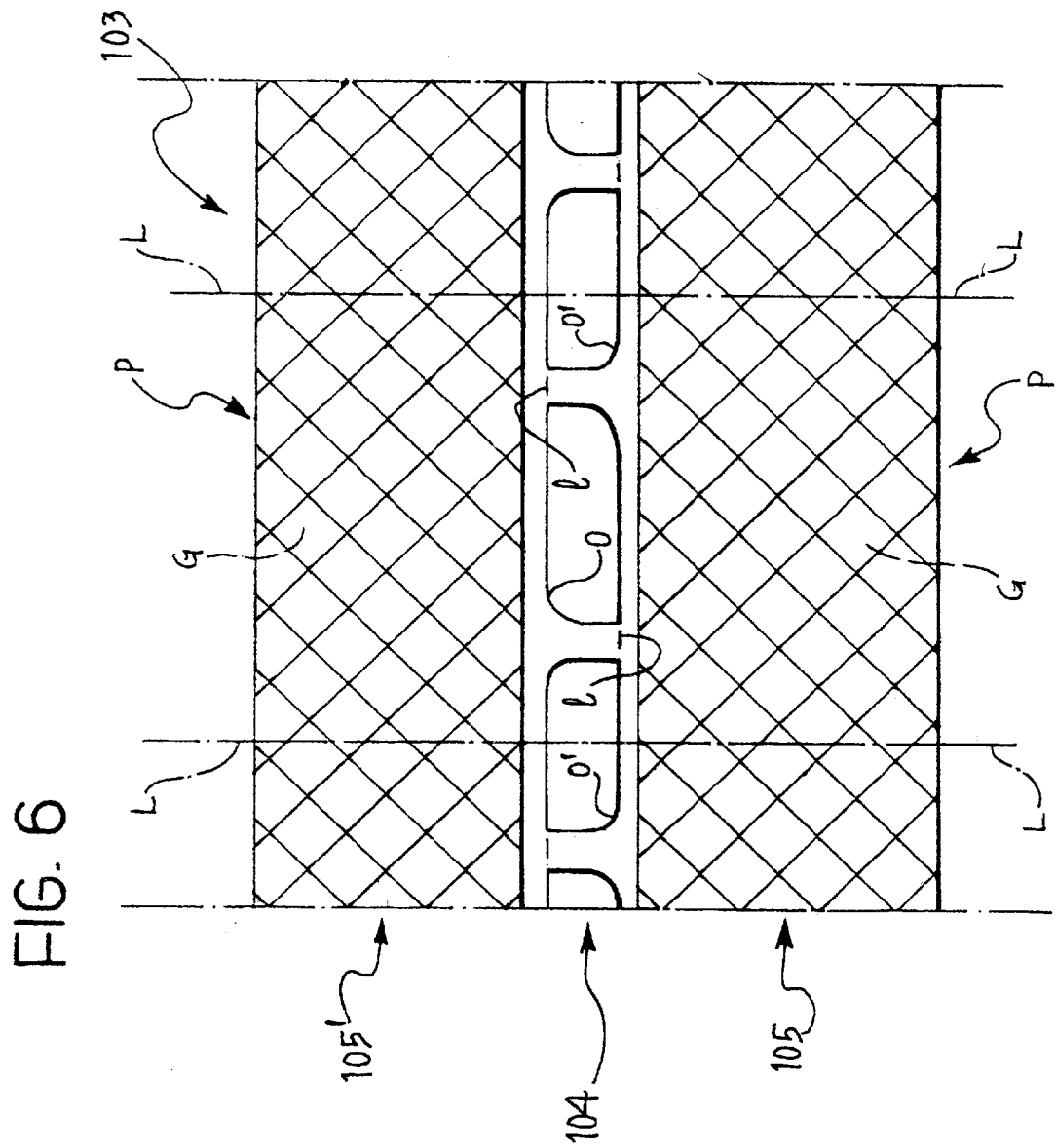
FIG. 6 shows a portion of grid strip indicated VI in FIG. 2, on an enlarged scale.

As can be appreciated from an observation of FIG. 6, the production of the plates P from the grid strip 103 involves the shearing of the strip along transverse lines such as those indicated L in that drawing, as well as the formation of a plurality of openings or windows 0, 0' (identical or different) in the central portion or band 104 of the strip and the blanking of the appendages or lugs along the lines indicated 1 in FIG. 6.

According to the invention, the openings or windows 0, 0' are advantageously formed in the expansion section 7 of the machine 4, as will be described further below. The shearing and separation of the plates P along the lines L and 1 of FIG. 6, however, are performed in a cutting station of known type, indicated 18 in FIG. 1, disposed downstream of a station 17 for pasting of the grid strip 103.

In order to form openings or windows 0, 0' in accordance with the invention, the expansion section shown in FIGS. 3 to 5 is used.

As can be seen in particular in FIG. 3, in the expansion section 7 above the plate 16 there is movably mounted a further horizontal plate 19, to the lower face of which there are fixed a plurality of punches 20 and 20' the cross-sections of which correspond substantially to the shapes of the openings or windows O and O', respectively. These punches are mounted for sliding through corresponding openings 21, 21' of the plate 16 and 22, 22' of the plate 15 of the expansion tool 14.

Openings 23 (23') are correspondingly formed in the base support 10 of the complementary tool or matrix 11 (FIG. 3) for receiving the punches 20, 20' when the plate 19 is lowered in order to punch a series of openings 0, 0'.

The plate 19 is supported for sliding vertically relative to guide pillars 24 fixed to the base plate 9, around which helical compression springs 25, which tend to keep the plate 19 in a raised position, are arranged.

The lowering of the plate 19 and of the associated punches 20, 20' can be controlled by means of a horizontal motor-driven shaft 26 having at least one drive eccentric or cam 27 which cooperates with the plate.

The expansion section 7 of the expansion machine 4 as described above thus enables openings or windows O, O' to be produced in phase with the operation of the expansion punching tool 14. This makes it possible to ensure that the connection appendages or lugs I of the plates P are always positioned in the desired manner relative to the transverse rows or lines of nodes of the meshes of the plates.

It is also pointed out that the use of a thrust feed device 6 at the input of the expansion machine 4, as well as the associated pulling device 8 at the output of the expansion section 7 of the machine, limits the stresses borne at the output of the expansion section by the grid strip which is mechanically "weakened" in comparison with the virgin starting strip. The possibility of the grid strip being broken is thus eliminated or at least reduced, even when the strip is very thin.

Ideally, the connection appendage or lug I should be positioned, relative to the end edges S of a plate P, substantially in the manner shown in FIG. 8, that is, at a predetermined distance D from one of the two borders or edges S of the plate. Moreover, these edges S ideally extend in the region of transverse lines of nodes of the meshes of the grid portion G of the plate, as can be seen in FIG. 8.

For various reasons, however, the lines along which the nodes of the meshes of the grid portion of a plate are aligned transversely may not be exactly perpendicular to the axis of the head H but may be slightly inclined, as indicated by the line of nodes indicated m in FIG. 7. This fault in the alignment of the nodes leads to the disadvantage that, at the edges S, the grid portion G of the plate of FIG. 7 has free limbs or ends f which may subsequently cause undesired contact between plates with different polarities in an accumulator.

Figure 9:
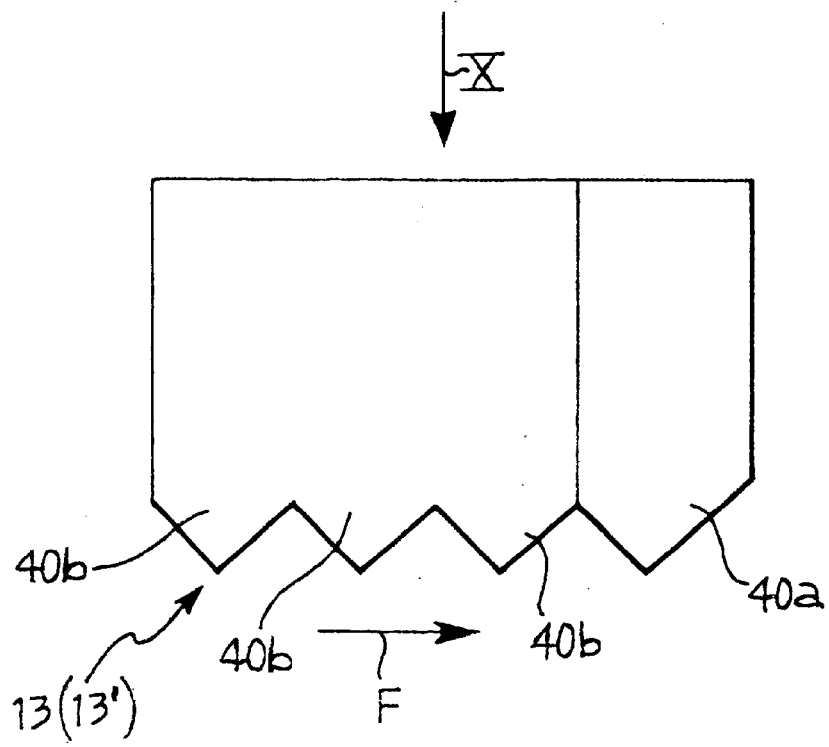
FIG. 9 is a side view of a punch for an expansion tool of a machine according to the invention.
Figure 10:
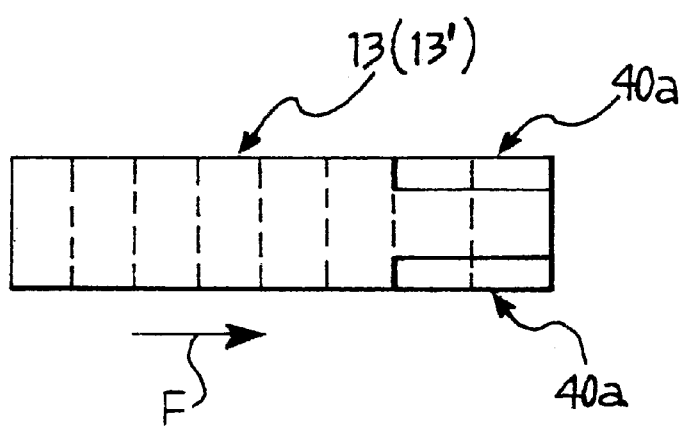
FIG. 10 is a view taken on the arrow X of FIG. 9.

To prevent this problem, the expansion punching tool 14 of the machine 4 is advantageously formed with punches 13 of the type shown in FIGS. 9 and 10. A punch of this type has n (n>2) teeth (n=4 in the embodiment of FIGS. 9 and 10). With reference to the direction of advance F of the strip 3 in the expansion section, the first tooth 40a of each punch 13 (13') is a mesh-reshaping tooth and is followed by n−1 cutting teeth 40b. Moreover, the feed device 6 and the associated pulling device 8 which are associated with the expansion machine 4 are arranged to feed the strip 3 in jumps or steps of a magnitude substantially corresponding to the overall longitudinal extent of the n−1 cutting teeth 40b, each time. The arrangement as a whole is such that, after the strip has advanced by one step, the reshaping tooth 40*a* of each punch 13 (13') engages in the mesh previously cut in the strip 3 by the last of the cutting teeth 40*b*, that is, by the tooth situated farthest to the left as seen in FIGS. 9 and 10.

The above-described arrangements ensure optimal transverse alignment of the nodes of the meshes of the grid strip so that, after shearing, the plates P produced always have the configuration shown in FIG. 8, without the formation of free limbs or ends at the edges S of the grid portion.

Naturally, the principle of the invention remaining the same, the forms of embodiment and details of construction may be varied widely with respect to those described and illustrated purely by way of non-limiting example, without thereby departing from the scope of the invention as defined in the appended claims.

In particular, the invention is not limited to the embodiment described in which the punches 20 (20') are operable separately from the expansion punching tool 14.

Moreover, the expansion machine 4 may comprise a plurality of successive expansion sections in accordance with the arrangement described in detail in the British patent cited above.

What is claimed is:

1. A method of producing accumulator plates having respective connection appendages or lugs, from a virgin strip, comprising the steps of:

moving a strip through an expansion machine having at least one expansion punching tool and an associated complementary tool having at least one punch, causing the expansion machine to operate in synchronism with the movement of the strip so as to form a grid strip having a non-expanded central portion and two longitudinal grid portions adjacent the central portion, and forming, in the non-expanded central portion, a plurality of openings or windows separated by transverse bridges, wherein the openings or windows are formed in the expansion machine by at least one punch of the complementary tool operated in synchronism with the operation of the expansion punching tool.

2. A method according to claim 1, in which the virgin strip is supplied to the expansion machine intermittently by means of a step feed device disposed upstream of the expansion tool and an associated pulling device disposed downstream of the expansion tool.

3. A method according to claim 1, in which the expansion punching tool comprises a plurality of punches each of which has n (n≧2) teeth of which a first tooth is a mesh-reshaping tooth and the other n−1 teeth are cutting teeth, the cutting teeth being able to cut n−1 meshes in the strip each time the expansion punching tool engages the strip, the strip being caused to advance, in each step, by a distance substantially corresponding to the overall longitudinal extent of the cutting teeth of a punch so that, for each step of the strip, the mesh-reshaping tooth engages in the mesh previously cut by the last of the cutting teeth of the same punch.

* * * * *